# 3,738,863
INORGANIC REFRACTORY LIQUID COMPOSITION

Suezo Sugaike and Masayuki Watanabe, Tokyo, and Tomitaro Kubo, Kanagawa-ken, Japan, assignors to Tokyo Shibaura Electric Co., Ltd., Kawasaki-shi, Japan
No Drawing. Filed July 9, 1971, Ser. No. 161,928
Claims priority, application Japan, July 10, 1970, 45/59,844
Int. Cl. C23c *3/00;* B44d *1/34*
U.S. Cl. 117—127                                                  7 Claims

ABSTRACT OF THE DISCLOSURE

The present invention provides (i) inorganic refractory liquid compositions comprising a metal nitride and potassium salts of phosphoric acid as main constituents, and (ii) a method of forming a phosphate of said metal by the reaction of said compositions at temperatures below 150° C.

BACKGROUND OF THE INVENTION

The present invention relates to inorganic refractory liquid compositions and a process for forming refractory material obtained by hardening said composition.

As conventional refractory paints, there are paints made refractory by adding inorganic salts to organic resins such as alkyd resin or silicone resin. These paints are not entirely of inorganic matter; therefore, such paints are simply flame-retarding. When such paints are heated at a temperature above 300 to 400° C. they exhibit deterioration as a result of softening or cracking. If such paints are exposed to flame, thy burn with black fume, liberating poisonous gas.

As compositions having better resistance against fire, there are known inorganic refractories such as aluminum phosphate, boron phosphate, etc. Aluminum phosphate, in particular, resists elevated temperatures higher than 1500° C. and also has adequate physical strength. It will be apparent that such refractories may be used widely if such inorganic refractories can be prepared as liquid compositions, applied to the surface of a base material, and then hardened by heating at normal temperatures or temperatures close to that temperature to form an inorganic refractory coating which is perfectly incombustible, fire resistant, and physically strong.

SUMMARY OF THE INVENTION

The present invention has for its object to provide inorganic refractories in the form of a liquid composition and a process for imparting fire resistance on various base materials by applying said liquid compositions to the surfaces of the various base materials and by subsequently hardening said applied liquid compositions.

Another object of this invention is to provide said liquid compositions as refractory adhesives.

The inorganic refractory liquid compositions relating to this invention are characterized by containing as main constituents (1) a metal nitride selected from the group consisting of aluminum nitride, chromium nitride, titanium nitride, iron nitride, and zirconium nitride, and (2) potassium salts of phosphoric acid such as $K_3PO_4$, $K_2HPO_4$ and $KH_2PO_4$ such a liquid composition is applied to the surface of a base material and thereafter reacted to harden it at a temperature in the range from room temperature to 150° C. so as to obtain an inorganic refractory coating. An advantage of using potassium salts of phosphoric acid lies in that compositions containing said metal nitrides and potassium salts of phosphoric acid as main constituents are weakly basic and can be applied to base materials susceptible to acidic matters such as aluminum and magnesium.

Further, volatile fluid such as water, alcohol, etc., and heat resistant inorganic substances such as silica, alumina, etc. may be added to the composition besides the aforementioned main constituents. The addition of refractory inorganic material such as alumina, etc. is useful for improving heat resistance and physical strength, and also facilitates the control of rate of hardening and the temperature at which hardening starts. The addition of volatile fluid such as water, alcohol, etc. helps to adjust the viscosity of the liquid composition.

In the invention of the present application, liquid compositions start hardening in the temperature range from room temperature to 150° C. Temperatures above 150° C. should be avoided, because the reaction suddenly takes place at such temperatures, making the formed coating porous or causing other defects.

EXAMPLE 1

25 parts of aluminum nitride, 25 parts of aqueous solution of dipotassium hydrogen phosphate $K_2HPO_4$ ($H_2O:K_2HPO_4=1:2$), and 4 parts of silica as a filler were mixed and stirred to a viscous muddy mixture and the pH value of said mixture was 10.19. When the mixture was coated on an aluminum plate and then heated at 70° C. for 30 minutes for hardening, the coating adhered firmly to the aluminum plate in a solid state. The coating did not crack, scale off, or cause other defects even when it was heated at about 500° C. for 3 hours; the adhesive strength remarkably increased and the coating was not scraped off by a knife.

EXAMPLE 2

25 parts of aluminum nitride and 25 parts of aqueous solution of tripotassium phosphate $K_3PO_4$ $$(H_2O:K_3PO_4=1:1)$$

were mixed to form a fluid, which was then adjusted to pH of 9.8 by adding phosphoric acid. The resultant mixture fluid was used as an adhesive to bond glass bars together and then heated at 70° C. for 30 minutes for hardening treatment. The deflective strength of the adhered joint was 500 kg./cm.$^2$. When use is made of an adhesive prepared by mixing together 25 parts of aluminum nitride and 25 parts of phosphoric acid, the resultant deflective strength was 300 kg./cm.$^2$. From these it will be appreciated that when use is made of an adhesive according to the present invention, the deflective strength is improved as compared with the latter adhesive.

EXAMPLE 3

25 parts of aluminum nitride, 25 parts of aqueous solution of dipotassium hydrogen phosphate $K_2HPO_4$ ($H_2O:K_2HPO_4=3:20$) and 20 parts of synthetic mica powders were mixed together to obtain a moist powder body. From this body, a cylindrical bar of 8 cm. in diameter and 15 cm. in length was obtained by press forming it under the atmosphere of normal temperature condition. The deflective strength of the resulting bar was 1,000–1,200 kg./cm.$^2$, the value of which is higher than 800–1,000 kg./cm.$^2$ obtained from a cylindrical bar which was likewise prepared by mixing together aluminum nitride, phosphoric acid and synthetic mica powders. The cylindrical bar according to the present invention still maintained its strength without deforming its original shape, even when heated in a furnace at a temperature of 100° C. for a period of 60 minutes.

EXAMPLE 4

50 parts if iron nitride and 30 parts of aqueous solution of tripotassium phosphate $K_3PO_4$ $$(H_2O:K_3PO_4=1:1)$$

were mixed to form a fluid and, the mixture was coated on plates of glass, asbestos, etc. When such coatings were dried at 70° C. for 30 minutes, it hardens to form a coating and firmly to the underlying base material.

EXAMPLE 5

40 parts of titanium nitride, 40 parts of aqueous solution of $K_2HPO_4$ ($H_2O:K_2HPO_4=1:1$) and 20 parts of silica were kneaded with water, and the mixture was coated on the bottoms of two cylindrical alumina porcelains of 2 cm. in diameter. When both coated faces were dried at about 100° C. for 30 minutes while they contacted with each other, the mixture hardened and both alumina porcelains were firmly adhered. The deflective strength of this adhered joint was more than 100 kg./cm.$^2$ and the adhesive strength did not decrease even when heated above 500° C.

EXAMPLE 6

60 parts of zirconium nitride and 40 parts of aqueous solution of $K_2HPO_4$ ($H_2O:K_2HPO_4=1:1$) were mixed and stirred to form a fluid, and the mixture was coated on plates of stainless steel, glass and asbestos. When the coatings were dried at 70° C. for about 30 minutes, the reaction readily took place and the hardened coatings were formed.

EXAMPLE 7

80 parts of an aqueous solution of tripotassium phosphate $K_3PO_4$ ($H_2O:K_3PO_4=1:1$) and 20 parts of chromium nitride were added to 20 parts of silicon nitride to form a viscous, muddy mixture. When the mixture was coated on plates of stainless steel, aluminum and asbestos and then heated at about 70° C. for 30 minutes for hardening treatment, it adhered to the plates firmly in a solid state. Even when the coatings where subjected to elevated temperatures of about 500° C. for 3 hours, they neither cracked nor peeled off but increased their adhesive strength so much so that they could not be scraped off with a knife.

As explained above, a metal salt of phosphoric acid, which is a refractory inorganic material, can be produced at low temperatures according to the present invention and hence this invention has very extensive applications. Aluminum phosphate formed in advance, for instance, must be heated to high temperatures above 1000° C. for sintering and such high temperatures cause troubles such as damages to filler and underlying material. However, refractory liquid compositions according to this invention react and harden at normal temperature or temperatures close thereto so there is no possibility of causing such damages and therefore may be applied successfully to base materials of poor heat resistance.

The mixture of the reactants of this composition, i.e., a metal nitride and a solution of a potassium phosphate, is a viscous fluid, and such a mixture has a great advantage that its viscosity or rate of reaction can be controlled by adding water or volatile solvent such as alcohol. Further, it has good extensibility and adhesive force and may be therefore used as incombustible inorganic paint or adhesive, the adhesive strength between the resulting hardened phosphate and the base material is very great and many materials may be used as a substrate. Inorganic materials, such as silica and alumina, may be added as additives to increase strength, and it is also possible to change the hardening starting temperature in the range from room temperature to 150 C. depending upon the application. The hardened phosphate resists high temperatures above 1000° C. and does not liberate fume or poisonous gas, being perfectly incombustible; hence, the fire resistance is much superior to conventional flame-retarding refractories containing organic matters as main constituents.

In the above examples, refractory liquid compositions according to this invention are used as paints or adhesives, but the application of the compositions is not limited to such examples and may have wide application such as castable refractory cement, fire-proof construction material, fire-proof layered material, or fire-proof electrically insulating material. Further, other ordinary inorganic refractory materials, e.g., asbestos, silicon carbide, metallic ders, etc. may be used as additives.

What we claim is:

1. A method of forming inorganic refractories which comprises:
    (A) providing a liquid composition containing (1) a nitride selected from the group consisting of aluminum nitride, chromium nitride, titanium nitride, iron nitride, and zirconium nitride, and (2) aqueous solution of a potassium salt of phosphoric acid
    (B) applying said liquid composition to the surface of a substrate, and thereafter
    (C) reacting ingredients of said composition at a temperature between about room temperature and 150° C. to obtain an inorganic refractory coating upon said substrate.

2. The method of claim 1 wherein said liquid composition additionally contains an inorganic filler.

3. The method of claim 2 wherein said inorganic filler is at least one selected from the group consisting of silica, alumina, mica, asbestos, silicon carbide, silicon nitride and metallic powder.

4. A method of forming inorganic refractories which comprises:
    (A) providing a liquid composition containing (1) a nitride selected from the group consisting of aluminum nitride, chromium nitride, titanium nitride, iron nitride, and zirconium nitride, (2) aqueous solution of a potassium salt of phosphoric acid, and (3) a solvent
    (B) applying said liquid composition to the surface of a substrate, and thereafter
    (C) reacting ingredients of said composition at a temperature between about room temperature and 150° C. to obtain an inorganic refractory coating upon said substrate.

5. The method of claim 4 wherein said solvent is selected from the group consisting of water and alcohol.

6. A method of forming inorganic refractories which comprises:
    (A) providing a liquid composition containing (1) a nitride selected from the group consisting of aluminum nitride, chromium nitride, titanium nitride, ron nitride, and zirconium nitride, (2) aqueous solution of a potassium salt of phosphoric acid, (3) a solvent and (4) an additive selected from at least one of the group consisting of silica, alumina, mica, asbestos, silicon carbide, silicon nitride and metallic powder,
    (B) casting said liquid composition upon a metal plate and thereafter
    (C) reacting ingredients of said composition at a temperature between about room temperature and 150° C. to obtain an organic refractory coating upon said metal plate.

7. A method of forming a refractory layer upon an inorganic substrate which comprises:
    (A) providing a liquid composition containing (1) a nitride selected from the group consisting of aluminum nitride, chromium nitride, titanium nitride, iron nitride, and zirconium nitride, and (2) aqueous solution of a potassium salt of phosphoric acid
    (B) applying a layer of said liquid composition to a substrate formed of inorganic material selected from the group consisting of metal, glass and asbestos, and thereafter
    (C) reacting ingredients of said composition at a temperature between about room temperature and 150° C. to obtain an inorganic refractory layer upon said substrate.

References Cited

UNITED STATES PATENTS

| | | | |
|---|---|---|---|
| 2,685,539 | 8/1954 | Woodburn et al. | 117—169 R |
| 1,098,794 | 6/1914 | Fleming | 106—55 X |
| 2,514,941 | 7/1950 | Drysdale et al. | 148—6.15 R |
| 2,515,934 | 7/1950 | Verner et al. | 148—6.15 R |
| 3,189,470 | 6/1965 | Long | 106—55 X |
| 3,394,087 | 7/1968 | Huang et al. | 106—55 X |

FOREIGN PATENTS

| | | | |
|---|---|---|---|
| 252,101 | 2/1967 | Austria | 106—55 |
| 207,825 | 12/1967 | U.S.S.R. | 23—105 |
| 1,109,484 | 6/1961 | Germany | 117—127 |
| 1,246,356 | 8/1967 | Germany | 117—127 |

WILLIAM D. MARTIN, Primary Examiner

S. P. BECK, Assistant Examiner

U.S. Cl. X.R.

117—124 A, 124 T, 126 AF, 135.1, 169